Dec. 5, 1944.  M. H. MARTIN  2,364,462
TRUCK
Filed Nov. 17, 1942  2 Sheets-Sheet 1
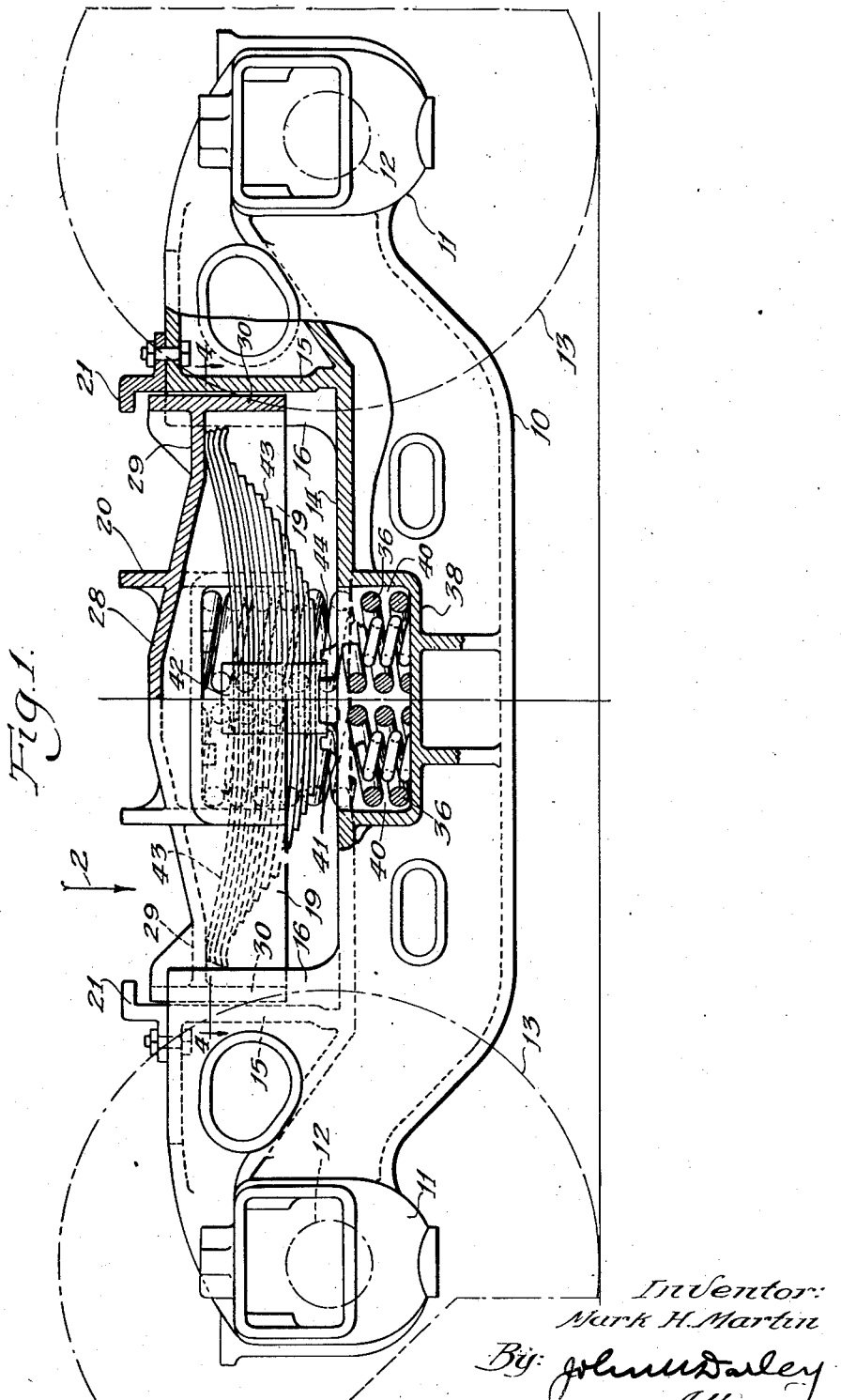

Dec. 5, 1944.   M. H. MARTIN   2,364,462
TRUCK
Filed Nov. 17, 1942   2 Sheets-Sheet 2
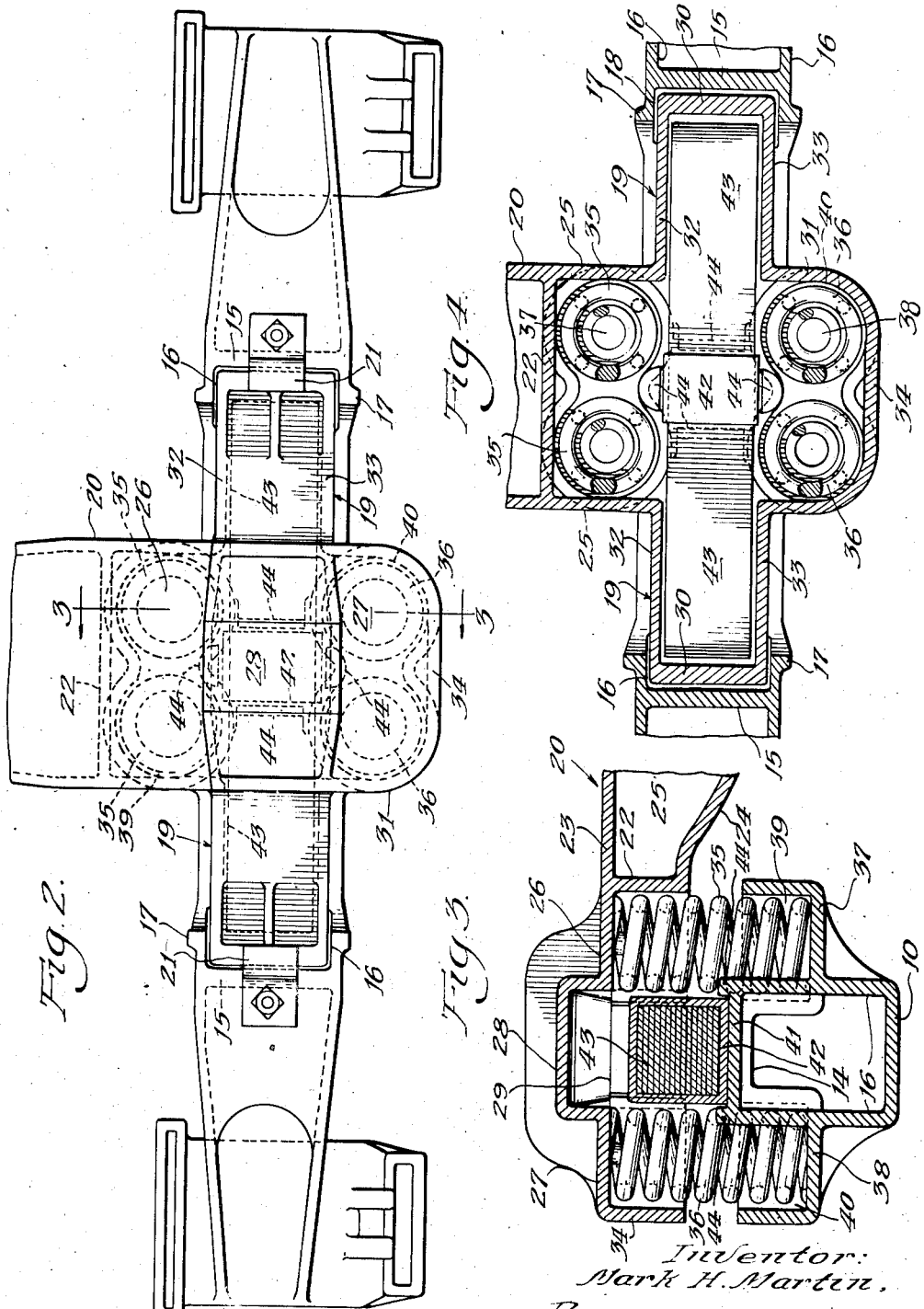
Inventor:
Mark H. Martin,
By John W Darley
Attorney.

Patented Dec. 5, 1944

2,364,462

UNITED STATES PATENT OFFICE 2,364,462

TRUCK

Mark H. Martin, Reading, Pa., assignor to Birdsboro Steel Foundry and Machine Company, Birdsboro, Pa., a corporation of Pennsylvania Application November 17, 1942, Serial No. 465,853

33 Claims. (Cl. 105—197.1)

My invention relates to railway car trucks of the freight car type and, in particular, a truck characterized by good riding qualities and capacity for high speed service.

Modern freight car truck design recognizes the disadvantages inherent in the simple coil spring suspension now commonly interposed between the bolster and side frames of a truck. Owing to track or wheel irregularities and the shocks imparted to the truck by out of surface rail joints, such spring groups tend to oscillate and set up a pendulum roll of the car body at some operating speed of the car, dependent upon the nature of the lading and the type of body. Synchronization of the natural period of the springs with the frequency of shocks transmitted to the truck by the rails and joints may increase the amplitude of the roll sufficiently to cause derailment on curves or to drive the springs solid with accompanying uncushioned shocks on the rails and possible failure of the springs. Various types of lading, such as fruit and live stock, are damaged by this action.

A characteristic design for solving the above problem may include groupings of different types of springs such as coil or freely acting springs and energy absorptive springs, such as plate or leaf springs, which have a mutually dampening action when subjected to a common load.

My improved truck is equipped with a non-synchronous, spring assembly as above indicated and one object of my invention is to include in the assembly long travel, relatively soft springs whereby shocks are largely absorbed in the assembly with a corresponding reduction in the magnitude of the blows transmitted to the truck and car body.

A further object is to provide a truck in which the springs are arranged and related to the truck bolster and side frames so as to insure a stable cooperation and controlled movement of these parts.

A further object is the provision of a car truck having side frames of the beam type in which the differently acting spring elements in each assembly are arranged in parallel, load transfer relation.

A further object is to devise a truck wherein the bolster engages the side frame guides at points closer to the journal boxes than in a truck having a truss side frame provided with a window opening to thereby more effectively maintain the desired working relation of the bolster and side frames and the "squareness" of the truck and so reduce wear on the rails and the wheel flanges.

These and further objects of my invention will be set forth in the following specification, reference being had to the accompanying drawings, and the novel means by which said objects are effectuated will be definitely pointed out in the claims.

In the drawings:

Fig. 1 is a side elevation of my improved truck, partly in section.

Fig. 2 is a plan view of one side frame and the cooperating end of the truck bolster as viewed in the direction of the arrow 2 in Fig. 1.

Figs. 3 and 4 are sections along the lines 3—3 and 4—4 in Figs. 2 and 1, all respectively.

Referring to the drawings, the numeral 10 designates a beam type, side frame having a box section and depressed intermediate its ends. Journal boxes 11 having conventional brasses and wedges (not shown) are provided at the ends of the frame for the reception of the usual journals 12 having wheels 13 secured thereto.

The upper web 14 of the central portion of the side frame 10 is disposed horizontally and at the ends thereof vertical webs 15 extend upwardly. Each web 15 is bridged between the vertical side walls 16 of the side frame adjacent the nearest journal box and each side wall 16 continues beyond the web 15 to form a guide flange 17. The flanges 17 and the webs 15 define a pair of bolster guides 18 which slidably receive wings 19 that project laterally from the end of the truck bolster 20 and lie in the same vertical plane which includes the side frame. The intermediate portion (not shown) of the bolster may be properly arranged for cooperation with a body or other part of the car body. The flanges 17 prevent endwise movement of the bolster 20 relative to the side frame while lugs 21, secured to the side frame at the upper ends of the webs, and extending towards the bolster, limit upward movement of the bolster and prevent separation thereof from the side frames in the event of derailment.

Between the side frames, the bolster 20 is also of box section and this section is terminated at each end by a vertical web 22 which extends between the top, bottom and side walls 23, 24 and 25 respectively, of the bolster and is inwardly spaced from the wings 19 endwise of the bolster. From the web 22 to the adjacent end of the bolster 20, including the wings 19, the bolster is of open bottom construction to receive certain elements of a spring assembly presently described.

For this purpose, the wall 23 extends beyond the web 22 to form spaced, horizontal spring seats 26 and 27, which are located inward and outward, respectively, of the wings 19. Between the seats 26 and 27, the wall 23 is offset upwardly to form the top wall 28 of the wings and the latter wall slopes downwardly in opposite directions from the center of the bolster to points adjacent the ends of the wings where the wall is disposed horizontally to form spring seats 29 (see Fig. 1). At each end of the wall 28 is a depending vertical web 30 which is guidably related to a cooperating web 15, and each web 30 is connected to the bolster side walls 25 outward of the web 22, and to side walls 31 outward of the wings by inner and outer side walls 32 and 33, respectively, which also depend from the top wall 28. The walls 25 and 31 may be aligned. The outer ends of the walls 31 are connected by an end wall 34 which, together with the walls 31 depend from the spring seat 27. Accordingly, the several depending side walls in connection with the top walls and spring seats define pockets for the reception of the upper ends of the elements comprising the spring suspension.

Each end of the bolster is supported in a side frame by a non-synchronous spring assembly comprising coil and work absorptive or leaf springs. Specifically, a pair of coil springs 35 is disposed inward of the wings 19 with the springs symmetric to and on opposite sides of the longitudinal center line of the bolster and a pair of coil springs 36 are similarly located outward of the wings 19. The upper ends of the springs 35 and 36 bear against the spring seats 26 and 27, respectively, while the lower ends rest on spring seats 37 and 38 forming part of inward and outward pockets 39 and 40, all respectively, provided on the side frame. As indicated in Fig. 3, the seats 37 and 38 extend laterally from the side walls 16 of the side frame and are disposed below the top wall 14 of the intermediate portion of the frame thus permitting the use of relatively long travel coil springs.

The middle portion of the wall 14 is raised slightly to provide a spring seat 41 on which rests the central spring band 42 of a semi-elliptic spring 43 whose ends extend upwardly within the wings 19 and bear against the spring seats 29. The seat 41 is flanked on all sides by lugs 44 which engage the spring band 42 and prevent endwise and transverse movements of the spring 43. Moreover, it will be noted that the elevation of the spring seat 41 relative to the wall 14 and of the bolster top wall 28 relative to the spring seats 29 insures free deflection of the spring 43 within its range of travel.

Under operating conditions, the springs 35, 36 and 43 act in unison and in parallel, load transfer relation to transmit loads to the side frame. Owing to the work absorptive nature of the leaf spring 43, its natural period of vibration is different from the coil springs 35 and 36 so a mutual dampening action is set up which inhibits any tendency towards synchronous vibration. In addition, these springs are arranged to provide softer cushioning action under light loads while incorporating the necessary stiffness and capacity for heavier loads. In this connection, it will be particularly noted that the relatively long travel coil springs are characterized by a relatively small deflection under varying blows and shocks so that the springs are capable of absorbing shocks to a considerable degree and accordingly reducing their effect on the truck and car body.

The relatively wide spacing of the bolster guides and the corresponding shaping of the ends of the bolster is an important feature of my invention. This construction, as compared to the usual arrangement in which the end of the bolster extends through the window opening of a truss type of side frame, provides a better working relation and relative control of the bolster and side frame, particularly in the matter of maintaining the "squareness" of the truck which is an important factor as regards reducing rail and flange wear.

The distribution of the springs insures a stable cooperation of the bolster and side frame and avoids areas of critical loading on these parts which is reflected in simple structural shapes and sections and corresponding light weight.

All of the foregoing features have been combined in a truck which is characterized by good riding qualities, adaptation for high speed service, and capacity for easy assembly and replacement of the several parts of the truck.

I claim:

1. In a truck, the combination of a beam type side frame having guide columns, a bolster slidable between the columns, and a spring assembly supporting the bolster on the frame comprising coil springs and a semi-elliptic leaf spring extending lengthwise of and having its central portion seated on the frame and its ends bearing against the bolster, the coil and leaf springs being arranged in parallel, load transfer relation.

2. In a truck, the combination of a beam type side frame having guide columns, a bolster slidable between the columns, and a spring assembly supporting the bolster on the frame comprising coil springs disposed in groups inward and outward of the frame and a semi-elliptic leaf spring located between the groups and having an intermediate portion seated on the frame and its ends bearing against the bolster.

3. In a truck, the combination of a beam type side frame having guide columns, a bolster slidable between the columns, and a spring assembly supporting the bolster on the frame comprising coil springs disposed in groups inward and outward of the frame and a semi-elliptic leaf spring extending lengthwise of the frame and located between the groups, an intermediate portion of the leaf spring being seated on the frame and the ends bearing against the bolster.

4. In a truck, the combination of a side frame having guide columns, a bolster slidable between the columns, and a spring assembly supporting the bolster on the frame comprising coil springs and a semi-elliptic leaf spring having an intermediate portion seated on the frame and its ends bearing against the bolster, the upper ends of all the springs bearing against the bolster in substantially the same horizontal plane and the lower ends of the coil springs seating on the frame at an elevation different from the seating of the leaf spring on the frame.

5. In a truck, the combination of a side frame having guide columns, a bolster slidable between the columns, and a spring assembly supporting the bolster on the frame comprising coil springs and a semi-elliptic leaf spring having an intermediate portion seated on the frame and its ends bearing against the bolster, the upper ends of all the springs bearing against the bolster in substantially the same horizontal plane and the lower ends of the coil springs seating on the frame below the seating of the leaf spring on the frame.

6. In a truck, the combination of a beam type side frame having an intermediate depressed portion of box section and guide columns at the ends of the portion, a bolster having an open bottom end slidable between the columns, and a spring assembly extending within the bolster end and supporting the bolster on the portion comprising coil springs and a semi-elliptic leaf spring, an intermediate part of the leaf spring seating on the portion and the ends bearing against the bolster.

7. In a truck, the combination of a beam type side frame having an intermediate depressed portion of box section and guide columns at the ends of the portion, a bolster having an open bottom end slidable between the columns, and a spring assembly extending within the bolster end and supporting the bolster on the portion comprising coil springs and a semi-elliptic leaf spring extending lengthwise of and having an intermediate portion seated on the frame and its ends bearing against the bolster.

8. In a truck, the combination of a beam type side frame having an intermediate depressed portion of box section and guide columns at the ends of the portion, a bolster having an open bottom end slidable between the columns, and a spring assembly extending within the bolster end and supporting the bolster on the portion comprising coil springs disposed in groups inward and outward of the portion and a semi-elliptic leaf spring located between the groups and having an intermediate part seated on the portion and its ends bearing against the bolster.

9. In a truck, the combination of a side frame having an intermediate depressed portion of box section and guide columns at the ends of the portion, a bolster having an open bottom end slidable between the columns, and a spring assembly extending within the bolster end and supporting the bolster on the portion comprising coil springs disposed in groups inward and outward of the portion and a semi-elliptic leaf spring extending lengthwise of the portion between the groups and having an intermediate part seated on the portion and its ends bearing against the bolster.

10. In a truck, the combination of a side frame having an intermediate depressed portion of box section and guide columns at the ends of the portion, a bolster having an open bottom end slidable between the columns, and a spring assembly extending within the bolster end and supporting the bolster on the portion comprising coil springs and a semi-elliptic leaf spring having an intermediate part seated on the frame and its ends bearing against the bolster, the upper ends of all the springs bearing against the bolster in substantially the same horizontal plane and the lower ends of the coil springs seating on the portion at an elevation different from the seating of the leaf spring thereon.

11. In a truck, the combination of a side frame having an intermediate depressed portion of box section and guide columns at the ends of the portion, a bolster having an open bottom end slidable between the columns, and a spring assembly extending within the bolster end and supporting the bolster on the portion comprising coil springs and a semi-elliptic leaf spring having an intermediate part seated on the portion and its ends bearing against the bolster, the upper ends of all the springs bearing against the bolster in substantially the same horizontal plane and the lower ends of the coil springs seating on the portion below the seating of the leaf spring thereon.

12. In a truck, the combination of a side frame having an intermediate depressed portion of box section including compression and tension webs and guide columns at the ends of the portion, a bolster having an open bottom end slidable between the columns, and a spring assembly extending within the bolster end and supporting the bolster on the portion comprising coil springs and a semi-elliptic leaf spring, an intermediate part of the leaf spring seating on the compression web and the ends bearing against the bolster and the lower ends of the coil springs resting on spring seats disposed between the compression and tension webs.

13. In a truck, the combination of a side frame having an intermediate depressed portion of box section including compression and tension webs and guide columns at the ends of the portion, a bolster having an open bottom end slidable between the columns, and a spring assembly extending within the bolster end and supporting the bolster on the portion comprising coil springs disposed in groups inward and outward of the portion and a semi-elliptic leaf spring located between the groups, an intermediate part of the leaf spring seating on the compression web and the ends bearing against the bolster and the lower ends of the coil springs resting on spring seats disposed between the compression and tension webs.

14. In a truck, the combination of a side frame having an intermediate depressed portion of box section including compression and tension webs and guide columns at the ends of the portion, a bolster having an open bottom end slidable between the columns, and a spring assembly extending within the bolster end and supporting the bolster on the portion comprising coil springs disposed in groups inward and outward of the frame and a semi-elliptic leaf spring extending lengthwise of the portion between the groups, an intermediate part of the leaf spring seating on the compression web with the ends bearing against the bolster and the lower ends of the coil springs resting on spring seats disposed between the compression and tension webs.

15. In a truck, the combination of a beam type side frame having journal boxes and guide columns disposed closer to the vertical center line of the boxes than to the vertical center line of the frame, a bolster having oppositely extending wings slidable between the columns, and a spring assembly supporting the bolster on the frame comprising coil springs disposed in groups inward and outward of the frame and a semi-elliptic leaf spring extending lengthwise of the frame between the groups and having an intermediate portion seated on the frame and its ends bearing against the wings.

16. In a truck, the combination of a beam type side frame having journal boxes and guide columns disposed closer to the vertical center line of the boxes than to the vertical center line of the frame, a bolster having oppositely extending wings slidable between the columns, and a spring assembly supporting the bolster on the frame comprising coil springs and a semi-elliptic leaf spring having an intermediate portion seated on the frame and its ends bearing against the wings, the upper ends of all the springs bearing against the bolster in substantially the same horizontal plane and the lower ends of the coil springs seating on the frame at an elevation different from the seating of the leaf spring thereon.

17. In a truck, the combination of a beam type side frame having journal boxes and guide columns disposed closer to the vertical center line of the boxes than to the vertical center line of the frame, a bolster having oppositely extending wings slidable between the columns, and a spring assembly supporting the bolster on the frame comprising coil springs and a semi-elliptic leaf spring having an intermediate portion seated on the frame and its ends bearing against the wings, the upper ends of all the springs bearing against the bolster in substantially the same horizontal plane and the lower ends of the coil springs seating on the frame below the seating of the leaf spring thereon.

18. In a truck, the combination of a beam type side frame having journal boxes, an intermediate depressed portion and guide columns disposed closer to the vertical center line of the boxes than to the vertical center line of the frame, a bolster having an open bottom end including oppositely extending wings slidable between the columns, and a spring assembly extending within the bolster end and supporting the bolster on the portion comprising coil springs and a semi-elliptic leaf spring, an intermediate part of the leaf spring seating on the portion and the ends bearing against the wings.

19. In a truck, the combination of a beam type side frame having journal boxes, an intermediate depressed portion and guide columns at the ends of the portion, a bolster having an open bottom end including oppositely extending wings slidable between the columns, and a spring assembly extending within the bolster end and supporting the bolster on the portion comprising coil springs and a semi-elliptic leaf spring, the coil springs and an intermediate part of the leaf spring seating centrally on the portion and the ends of the leaf spring bearing against the bolster adjacent the ends of the wings.

20. A beam type side frame having an intermediate depressed portion of box section including compression and tension webs, a spring seat formed on the compression web, and spring seats extending from the opposite sides of the section between the webs.

21. In a truck, the combination of a side frame having guide columns, a bolster slidable between the columns, and a spring assembly supporting the bolster on the frame comprising coil springs and a semi-elliptic leaf spring extending lengthwise of the frame and having an intermediate portion seated on the frame and its ends bearing against the bolster, all of the springs being arranged in parallel, load transfer relation and the lower ends of the coil springs seating on the frame at an elevation different from the seating of the leaf spring on the frame.

22. In a truck, the combination of a side frame having an intermediate depressed portion of box section and guide columns at the ends of the portion, a bolster having an open bottom end slidable between the columns, and a spring assembly extending within the bolster end and supporting the bolster on the portion comprising coil springs and a semi-elliptic leaf spring extending lengthwise of the frame and having an intermediate part seated on the frame and its ends bearing against the bolster, all of the springs being arranged in parallel, load transfer relation and the lower ends of the coil springs seating on the portion at an elevation different from the seating of the leaf spring thereon.

23. In a truck, the combination of a side frame having an intermediate depressed portion of box section and guide columns at the ends of the portion, a bolster having an open bottom end slidable between the columns, and a spring assembly extending within the bolster end and supporting the bolster on the portion comprising coil springs and a semi-elliptic spring extending lengthwise of the frame and having an intermediate part seated on the frame and its ends bearing against the bolster, the lower ends of the coil springs seating on the portion at an elevation different from the seating of the leaf spring thereon.

24. In a truck, the combination of a beam type side frame having guide columns, a bolster slidable between the columns, and a spring assembly supporting the bolster on the frame comprising coil springs disposed in groups inward and outward of the frame and a semi-elliptic leaf spring extending lengthwise of the frame and located between the groups, the intermediate portion of the leaf spring being seated on the frame and the ends bearing against the bolster and the lower ends of the coil springs seating on the frame at an elevation different from the seating of the leaf spring on the frame.

25. In a truck, the combination of a beam type side frame having guide columns, a bolster slidable between the columns, and a spring assembly supporting the bolster on the frame comprising coil springs disposed in groups inward and outward of the frame and a semi-elliptic leaf spring extending lengthwise of the frame and located between the groups, the intermediate portion of the leaf spring being seated on the frame and the ends bearing against the bolster, the upper ends of all the springs bearing against the bolster in substantially the same horizontal plane and the lower ends of the coil springs seating on the frame at an elevation different from the seating of the leaf spring on the frame.

26. In a truck, the combination of a side frame having an intermediate depressed portion of box section including compression and tension webs and guide columns at the ends of the portion, a bolster having an open bottom end slidable between the columns, and a spring assembly extending within the bolster end and supporting the bolster on the portion comprising coil springs and a semi-elliptic leaf spring, the central part of the leaf spring seating on the compression web and the ends bearing against the bolster and the lower ends of the coil springs resting on spring seats disposed between the compression and tension webs, the upper ends of all the springs bearing against the bolster in substantially the same horizontal plane.

27. In a truck, the combination of a beam type side frame having an intermediate depressed portion of box section and guide columns at the ends of the portion, a box section bolster having an open bottom end slidable between the columns, and a spring assembly extending within the bolster end and supporting the bolster on the portion comprising coil springs disposed in groups inward and outward of the portion and a semi-elliptic leaf spring extending lengthwise of the portion between the groups and having an intermediate part seated on the portion and its ends bearing against the bolster, a substantial portion of the leaf spring being housed within the bolster end.

28. In a truck, the combination of a beam type side frame having an intermediate depressed portion of box section and guide columns at the ends of the portion, a box section bolster having an open bottom end slidable between the columns, and a spring assembly extending within the bolster end and supporting the bolster on the portion comprising coil springs and a semi-elliptic leaf spring having an intermediate part seated on the frame and its ends bearing against the bolster, the upper ends of all the springs bearing against the bolster in substantially the same horizontal plane and the lower ends of the coil springs seating on the portion at an elevation different from the seating of the leaf spring thereon, a substantial portion of the leaf spring being housed within the bolster end.

29. In a truck, the combination of a beam type side frame having an intermediate depressed portion of box section and guide columns at the ends of the portion, a box section bolster having an open bottom end slidable between the columns, and a spring assembly extending within the bolster end and supporting the bolster on the portion comprising coil springs and a semi-elliptic leaf spring having an intermediate part seated on the frame and its ends bearing against the bolster, the upper ends of all the springs bearing against the bolster in substantially the same horizontal plane and the lower ends of the coil springs seating on the portion below the seating of the leaf spring thereon, a substantial portion of the leaf spring being housed within the bolster end.

30. In a truck, the combination of a beam type side frame having an intermediate depressed portion of box section including compression and tension webs and guide columns at the ends of the portion, a box section bolster having an open bottom end slidable between the columns, and a spring assembly extending within the bolster end and supporting the bolster on the portion comprising coil springs and a semi-elliptic leaf spring, an intermediate part of the leaf spring seating on the compression web and the ends bearing against the bolster and the lower ends of the coil springs resting on spring seats disposed between the compression and tension webs, a substantial portion of the leaf spring being housed within the bolster end.

31. In a truck, the combination of a beam type side frame having an intermediate depressed portion of box section including compression and tension webs and guide columns at the ends of the portion, a box section bolster having an open bottom end slidable between the columns, and a spring assembly extending within the bolster end and supporting the bolster on the portion comprising coil springs disposed in groups inward and outward of the portion and a semi-elliptic leaf spring located between the groups, an intermediate part of the leaf spring seating on the compression web and the ends bearing against the bolster and the lower ends of the coil springs resting on spring seats disposed between the compression and tension webs, a substantial portion of the leaf spring being housed within the bolster end.

32. In a truck, the combination of a beam type side frame having an intermediate depressed portion of box section including compression and tension webs and guide columns at the ends of the portion, a box section bolster having an open bottom end slidable between the columns, and a spring assembly extending within the bolster end and supporting the bolster on the portion comprising coil springs disposed in groups inward and outward of the portion and a semi-elliptic leaf spring extending lengthwise of the portion between the groups, an intermediate part of the leaf spring seating on the compression web and the ends bearing against the bolster and the lower ends of the coil springs resting on spring seats disposed between the compression and tension webs, a substantial portion of the leaf spring being housed within the bolster end.

33. In a truck, the combination of a side frame having an intermediate depressed portion and guide columns, a bolster slidable between the columns, and a spring assembly supporting the bolster on the portion comprising coil springs and friction absorptive spring means having central and laterally disposed bearing parts, the upper ends of the springs and the lateral parts of the spring means bearing against the bolster in substantially the same horizontal plane and the lower ends of the coil springs seating on the portion at an elevation different from the seating of the central part of the spring means thereon.

MARK H. MARTIN.